United States Patent
Cogley

(10) Patent No.: US 10,517,272 B1
(45) Date of Patent: Dec. 31, 2019

(54) CAT THUMPER SYSTEM

(71) Applicant: Thomas P. Cogley, Pinellas Park, FL (US)

(72) Inventor: Thomas P. Cogley, Pinellas Park, FL (US)

( * ) Notice: Subject to any disclaimer, the term of this patent is extended or adjusted under 35 U.S.C. 154(b) by 0 days.

(21) Appl. No.: 16/241,650

(22) Filed: Jan. 7, 2019

Related U.S. Application Data

(63) Continuation-in-part of application No. 15/409,507, filed on Jan. 18, 2017, now Pat. No. 10,172,326.

(60) Provisional application No. 62/280,425, filed on Jan. 19, 2016.

(51) Int. Cl.
    *A01K 15/00* (2006.01)
    *A01K 25/00* (2006.01)

(52) U.S. Cl.
    CPC .............. *A01K 15/00* (2013.01); *A01K 25/00* (2013.01)

(58) Field of Classification Search
    CPC .......... A01K 15/04; A01K 25/00; H01H 3/12; H01H 13/14
    See application file for complete search history.

(56) References Cited

U.S. PATENT DOCUMENTS

| | | | | |
|---|---|---|---|---|
| 2,374,873 | A * | 5/1945 | McDonald, Jr. | H01H 13/14 200/16 R |
| 2,394,144 | A * | 2/1946 | Brose | A01K 27/001 119/862 |
| 3,246,112 | A * | 4/1966 | Adams | H01H 13/14 200/302.2 |
| 2018/0168128 | A1 * | 6/2018 | Leach | A01K 15/04 |

* cited by examiner

*Primary Examiner* — Kristen C Hayes

(57) ABSTRACT

A housing has a top, a bottom, and a side wall. A spacer is coupled to and depends downwardly from the bottom of the housing creating a chamber beneath the bottom of the housing within the spacer. A rod is has an upper end within the housing and a lower end there beneath. Drive mechanisms located within the housing and coupled to the rod reciprocate the rod between a retracted position and an extended position. The retracted position is with the lower end within the chamber. The extended position being with the lower end extending beneath the chamber.

3 Claims, 1 Drawing Sheet

CAT THUMPER SYSTEM

RELATED APPLICATION

The present invention is a continuation-in-part of application Ser. No. 15/409,507 filed Jan. 18, 2017, issuing Jan. 8, 2019 as U.S. Pat. No. 10,172,326, which is based upon provisional application 62/280,425 filed Jan. 19, 2016, the subject matter of which applications is incorporated herein by reference and the priority of which is hereby claimed.

BACKGROUND OF THE INVENTION

Field of the Invention

The present invention relates to a cat thumper system and more particularly pertains to repeatedly tapping a head of a cat for calming the cat in response to the tapping. The tapping and the calming are done in a safe, convenient, and economical manner.

Description of the Prior Art

The use of cat calming systems of known designs and configurations is known in the prior art. More specifically, cat calming systems of known designs and configurations previously devised and utilized for the purpose of calming cats are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a cat thumper system that allows repeatedly tapping a head of a cat for calming the cat in response to the tapping. The tapping and the calming are done in a safe, convenient, and economical manner.

In this respect, the cat thumper system according to the present invention substantially departs from the conventional concepts and designs of the prior art, and in doing so provides an apparatus primarily developed for the purpose of repeatedly tapping a head of a cat for calming the cat in response to the tapping. The tapping and the calming are done in a safe, convenient, and economical manner.

Therefore, it can be appreciated that there exists a continuing need for a new and improved cat thumper system which can be used for repeatedly tapping a head of a cat for calming the cat in response to the tapping. The tapping and the calming are done in a safe, convenient, and economical manner. In this regard, the present invention substantially fulfills this need.

SUMMARY OF THE INVENTION

In view of the disadvantages inherent in the known types of cat calming systems of known designs and configurations now present in the prior art, the present invention provides an improved cat thumper system. As such, the general purpose of the present invention, which will be described subsequently in greater detail, is to provide a new and improved cat thumper system and method which has all the advantages of the prior art and none of the disadvantages.

To attain this, for a broad perspective, the present invention essentially comprises a cat thumper system. In this broad context, first provided is a housing having a top, a bottom, and a side wall between the top and the bottom. Next, a spacer is provided coupled to and depending downwardly from the bottom of the housing thereby creating a chamber beneath the bottom of the housing within the spacer. A rod is next provided having an upper end within the housing and a lower end there beneath. Lastly, drive mechanisms located within the housing and coupled to the rod are adapted to reciprocate the rod between a retracted position and an extended position. The retracted position is with the lower end within the chamber. The extended position being with the lower end extending beneath the chamber.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved cat thumper system which has all of the advantages of the prior art cat calming systems of known designs and configurations and none of the disadvantages.

It is another object of the present invention to provide a new and improved cat thumper system which may be easily and efficiently manufactured and marketed.

It is a further object of the present invention to provide a new and improved cat thumper system which is of durable and reliable constructions.

An even further object of the present invention is to provide a new and improved cat thumper system which is susceptible of a low cost of manufacture with regard to both materials and labor, and which accordingly is then susceptible of low prices of sale to the consuming public, thereby making such cat thumper system economically available to the buying public.

Lastly, it is an object of the present invention to provide a cat thumper system for repeatedly tapping a head of a cat for calming the cat in response to the tapping. The tapping and the calming are done in a safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
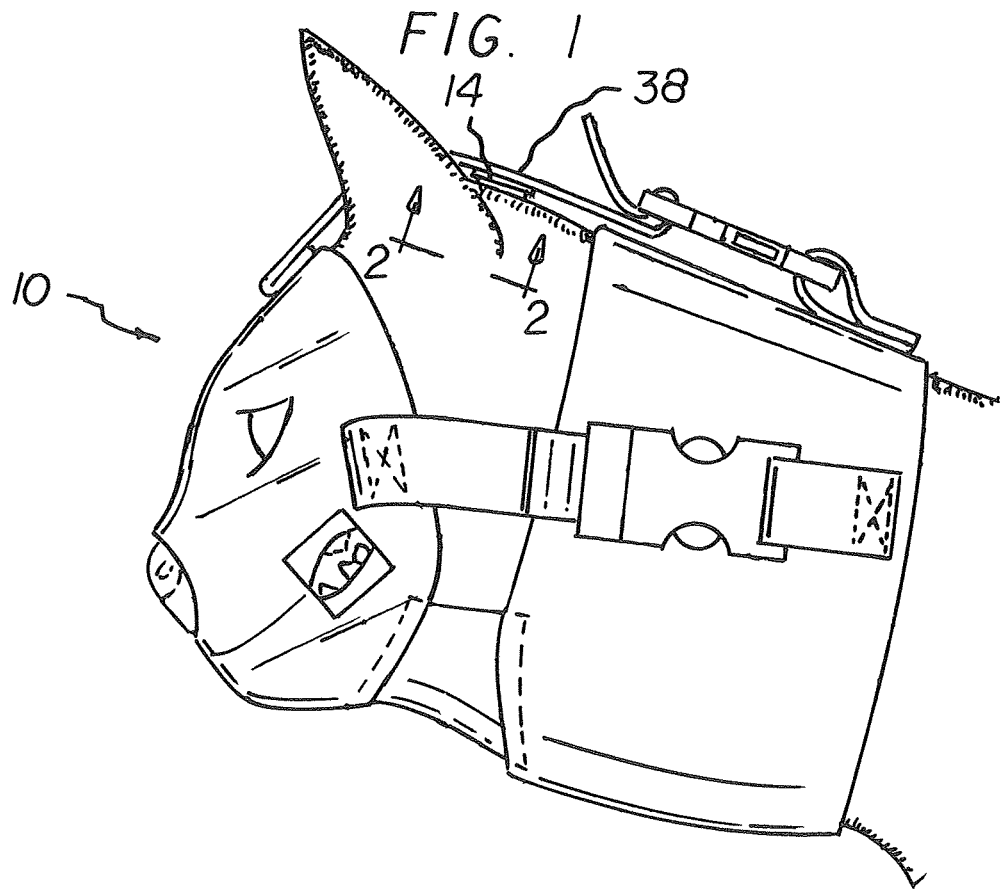
FIG. 1 is a side elevational view of a cat thumper system constructed in accordance with the principles of the present invention.
Figure 2:
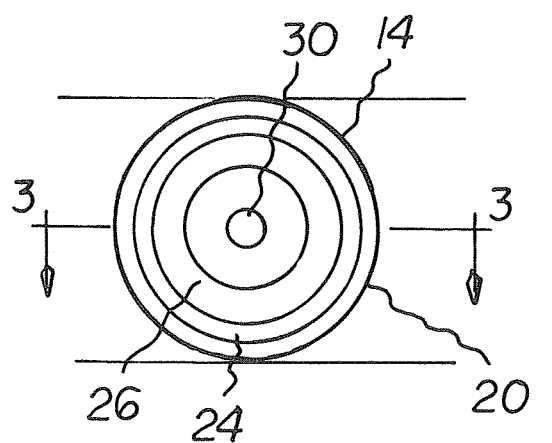
FIG. 2 in an enlarged bottom view of the cat thumper system taken along line 2-2 of FIG. 1.
Figure 3:
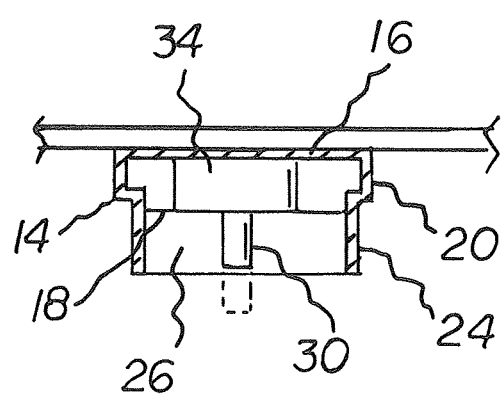
FIG. 3 is a cross sectional view taken along line 3-3 of FIG. 2 showing in solid lines the rod in a retracted orientation and showing in broken lines the rod in an extended orientation.

With reference now to the drawings, and in particular to FIG. 1 thereof, the preferred embodiment of the new and improved cat thumper system embodying the principles and concepts of the present invention and generally designated by the reference numeral 10 will be described.

The present invention, the cat thumper system 10 is comprised of a plurality of components. Such components in their broadest context include a housing, a spacer, a rod and drive mechanisms. Such components are individually configured and correlated with respect to each other so as to attain the desired objective.

From a specific perspective, the invention of the present application is a cat thumper system 10 for repeatedly tapping a head of a cat for calming the cat in response to the tapping. The tapping and the calming are done in a safe, convenient, and economical manner. In the preferred embodiment, first provided is a housing 14 having a top 16 in a circular configuration and a bottom 18 in a circular configuration. The housing has a cylindrical side wall 20 between the top and the bottom. The top, the bottom, and the cylindrical side wall have the same central axis.

Next provided is a spacer 24. The spacer is in an annular configuration. The spacer is coupled to and depends downwardly from the bottom of the housing thereby creating a chamber 26 beneath the bottom of the housing within the spacer. The chamber has a cylindrical configuration with an axis coextensive with the central axis. The chamber has a diameter of from 2 inches to 4 inches.

A rod 30 having a cylindrical configuration is next provided. The rod has an upper end within the housing and a lower end beneath the housing. The rod has an axis coextensive with the central axis. The rod is fabricated of an elastomeric material chosen from the class of materials including plastic and rubber, natural and synthetic, and blends thereof.

Next provided are drive mechanisms 34. The drive mechanisms are located within the housing and are coupled to the rod. The drive mechanisms are adapted to reciprocate the rod between a retracted position and an extended position. The retracted position is with the lower end within the chamber. The extended position is with the lower end extending beneath the chamber by 0.25 inches plus or minus 10 percent. The drive mechanisms reciprocate the rod with a throw of at least 0.50 inches plus or minus 10 percent at 60 cycles per minute. The drive mechanisms are chosen from electrically powered drivers and mechanical wind up drivers.

Lastly, coupling components 38 are provided which removably secure the cylindrical side wall of the housing to the head of the cat being thumped.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cat thumper system comprising:
   a housing having a top and a bottom and a side wall between the top and the bottom;
   a spacer coupled to and depending downwardly from the bottom of the housing thereby creating a chamber beneath the bottom of the housing within the spacer;
   a rod having an upper end within the housing and a lower end there beneath;
   drive mechanisms located within the housing and coupled to the rod adapted to reciprocate the rod between a retracted position and an extended position, the retracted position being with the lower end within the chamber, the extended position being with the lower end extending beneath the chamber; and
   coupling component removably securing the housing to a top of a head of a cat.

2. A cat thumper system comprising:
   a housing having a top and a bottom and a side wall between the top and the bottom;
   a spacer coupled to and depending downwardly from the bottom of the housing thereby creating a chamber beneath the bottom of the housing within the spacer;
   a rod having an upper end within the housing and a lower end there beneath; and
   drive mechanisms located within the housing and coupled to the rod adapted to reciprocate the rod between a retracted position and an extended position, the retracted position being with the lower end within the chamber, the extended position being with the lower end extending beneath the chamber wherein the drive mechanisms are electrically powered drivers.

3. A cat thumper system (10) for repeatedly tapping a head of a cat and for calming the cat in response to the tapping comprising, in combination:
   a housing (14) having a top (16) in a circular configuration and a bottom (18) in a circular configuration and a cylindrical side wall (20) between the top and the bottom, the top and the bottom and the cylindrical side wall having a same central axis;

a spacer (24) with an annular configuration coupled to and depending downwardly from the bottom of the housing thereby creating a chamber (26) beneath the bottom of the housing within the spacer, the chamber having a cylindrical configuration with an axis coextensive with the central axis, the chamber having a diameter of from 2 inches to 4 inches;

a rod (30) having a cylindrical configuration with an upper end within the housing and a lower end there beneath, the rod having an axis coextensive with the central axis, the rod being fabricated of an elastomeric material chosen from the class of materials including plastic and rubber, natural and synthetic, and blends thereof;

drive mechanisms (34) located within the housing and coupled to the rod adapted to reciprocate the rod between a retracted position and an extended position, the retracted position being with the lower end within the chamber, the extended position being with the lower end extending beneath the chamber by 0.25 inches plus or minus 10 percent, the drive mechanisms reciprocating the rod with a throw of at least 0.50 inches plus or minus 10 percent at 60 cycles per minute; and coupling components (38) removably securing the cylindrical side wall of the housing to the head of the cat being thumped.

\* \* \* \* \*